United States Patent [19]

Dutschke et al.

[11] Patent Number: 5,425,603
[45] Date of Patent: Jun. 20, 1995

[54] SHELL END MILL

[75] Inventors: Bernd Dutschke, Vaihingen an der Enz-Kleinglattbach; Wolfgang Seibel, Besigheim, both of Germany

[73] Assignee: SPANTEC-Werkzeugtechnik GmbH, Vaihingen-Horrheim, Germany

[21] Appl. No.: 157,072

[22] PCT Filed: Mar. 14, 1992

[86] PCT No.: PCT/EP92/00568
§ 371 Date: Nov. 30, 1993
§ 102(e) Date: Nov. 30, 1993

[87] PCT Pub. No.: WO92/21471
PCT Pub. Date: Dec. 10, 1992

[30] Foreign Application Priority Data

May 31, 1991 [DE] Germany ............ 41 17 900.5

[51] Int. Cl.⁶ .................... B23C 5/10; B23C 5/20; B23C 5/26
[52] U.S. Cl. ...................... 407/40; 407/55; 407/59
[58] Field of Search ............ 407/40, 42, 48, 55, 407/59

[56] References Cited

U.S. PATENT DOCUMENTS 4,714,383 12/1987 Shimomura et al. ............ 407/42
4,790,693 12/1988 Koblesky ............ 407/35
5,083,887 1/1992 Dotany ............ 407/59

FOREIGN PATENT DOCUMENTS 3314049 10/1984 Germany.
3812150 9/1989 Germany.
8908481 10/1989 Germany.

Primary Examiner—William E. Terrell
Attorney, Agent, or Firm—Flynn, Thiel, Boutell & Tanis

[57] ABSTRACT

The invention relates to a shell end mill with a holder (12), a two-piece cylindrical cutting section (10) releasably secured to the holder (12), at least two helical chip grooves (18) at a circumferential distance apart in the cutting section (10), a set of substantially radial base support surfaces (22) arranged one behind the other along a chip groove side and a insert seat (20) with radially limiting side support surfaces on the groove base side to take indexable inserts (24) in an arrangement of axially overlapping pairs. The inner tips (24) arranged behind the outermost frontal indexable inserts (24') are axially clamped to the insert seats without abutment. In particular, the frontally inoperative cut (42) of the inner indexable inserts (24) engages without abutment in a back-cut (46) in the adjacent insert seat. This design makes it possible to make the base support surfaces (22) of the indexable inserts and the back-cuts (46) engaging with them frontally simply and logically by shell milling in the cutting section (10).

21 Claims, 4 Drawing Sheets

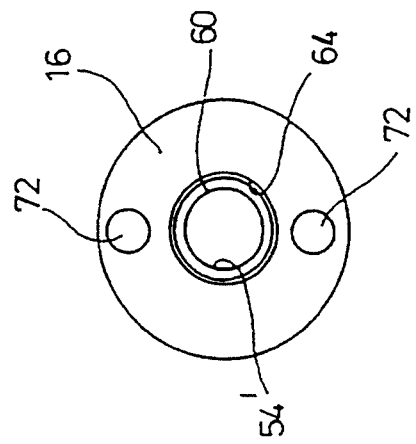
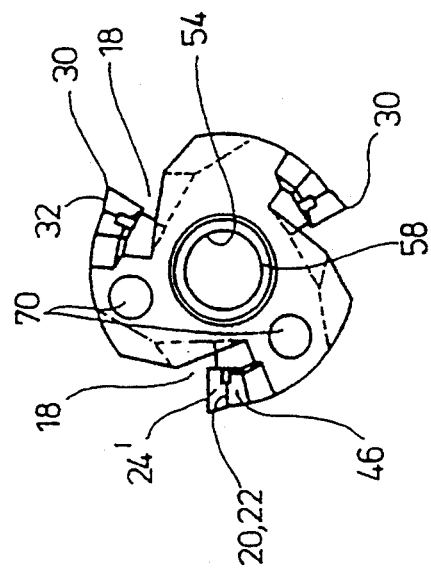
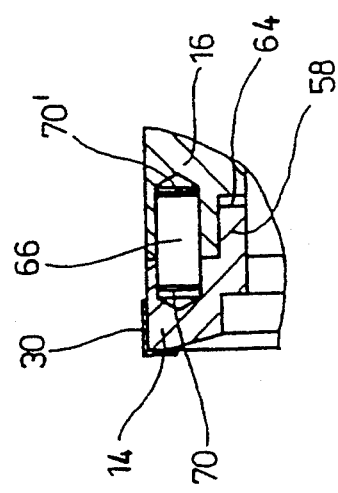
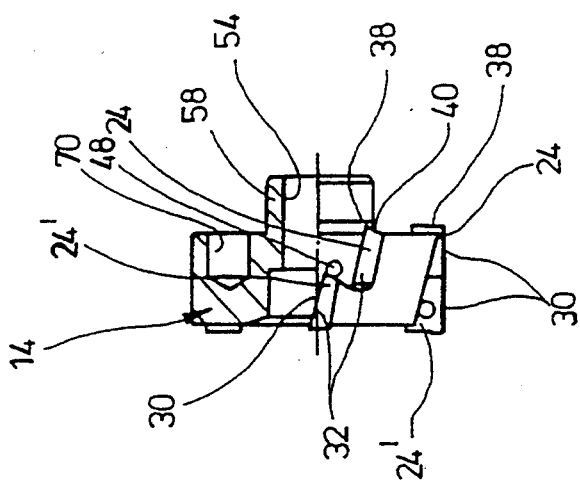

SHELL END MILL

FIELD OF THE INVENTION

The invention relates to a shell end mill comprising a holder, a cylindrical cutting section connected to the holder, at least two preferably helical chip grooves arranged in the cutting section and spaced from one another in circumferential direction and each one row of insert seats arranged one after the other along one side of a chip groove and each one having an essentially radially aligned base support surface and a side support surface radially defining the same on the side of the base of the groove for receiving cutting inserts, which are preferably designed as indexable inserts and can be fastened on the cutting section by means of a center clamping screw engaging a screw bore in the area of the base support surface, in an arrangement of axially overlapping pairs. The cutting inserts project radially beyond the cutting section with a main cutting edge and a free surface following the main cutting edge. The frontal outermost cutting inserts of each one row of cutting inserts project with a face cutting edge and a free surface following the face cutting edge axially beyond the cutting section.

BACKGROUND OF THE INVENTION

In shell end mills with full cutting rows of cutting inserts, usually the inner cutting inserts are arranged behind the frontal outermost cutting insert so that the cutting edge arranged on the receiving side is active, whereas the frontally arranged cutting edge is covered up by the adjacent active cutting edge and is therefore inactive. In order to be able to absorb the axial cutting force components acting onto the cutting inserts, the inner cutting inserts were supported frontally against an axial abutment surface. To create an insert seat with an axial abutment surface, however, requires a considerable manufacturing expense. The plate base must be created by an end mill in view of the axial abutment surface to be created at the same time, which end mill, because of the deep machining positions, requires a relatively large cantilever length, and which, to avoid collisions with adjacent interfering edges, can operate only with relatively narrow tool holders. This results in both the machining precision and the machining speed with much to be desired. Furthermore, the cutting section in conventional shell end mills is usually connected in one piece with the holder so that extensive storage is needed for various mill sizes and holder designs.

The basic purpose of the invention is to develop a shell end mill of the above-disclosed type, which can be manufactured easily and economically and in spite of this meets high requirements with respect to function.

SUMMARY OF THE INVENTION

The solution of the invention is essentially based on the thought that the inner cutting inserts of each one row of cutting inserts, which inner cutting inserts are arranged behind the frontal outermost cutting insert, project abutment-free over the associated insert seat with an active cutting edge arranged on the receiving side and a free surface following said cutting edge, and engage abutment-free a free space behind the frontally adjacent cutting insert with their frontally arranged inactive cutting insert and a free surface following said cutting insert. According to a preferred embodiment of the invention, the inner cutting inserts engage abutment-free with their frontal cutting edge and the free surface following the cutting edge, an undercut of the adjacent insert seat. These measures make it possible to create the insert seats by shell end milling not as this has been done up to now by face milling. After the helical chip grooves are created with an end mill, and the groove sides on the insert side are prepared by shell end milling for creating the insert seats, the base support surfaces and the undercuts for receiving the frontal cutting edges are created in a single operation one after the other by an end mill in a shell milling process. With this, the manufacturing speed of the plate seats is increased at least by the factor 3, which, in view of the plurality of insert seats contained in one plain milling cutter is a significant step forward in a manufacturing technical respect.

In order to avoid an undesired axial movement of the cutting inserts in spite of the missing axial abutment surfaces, care must be taken on the one hand that the cutting inserts are pressed sufficiently frictionally against the base support surface and the side support surface with the help of the center clamping screw. The latter is possible because the center distance between the screw bore and the side support surface has compared with the respective dimension of the cutting insert an undersize of 0.1 to 0.2 mm.

Furthermore care can be taken through design measures that the axial components of the cutting forces engaging the insert substantially cancel one another. In order to achieve this, a preferred embodiment of the invention suggests that the base support surface of the insert seat and the main cutting edge of the associated cutting insert define an acute angle converging toward the receiving side with one another.

A further improvement in this respect can be achieved by the side support surface being divided into two surface parts defining a two-point abutment and being arranged spaced apart, and according to a further preferred embodiment of the invention by the side surface of the cutting insert, which side surface rests against the side support surface, being slightly curved or beveled and thus being pressed positively and frictionally against the surface parts, which in this case are spacially differently aligned.

To reduce the need for storage, it is of a particular advantage when the cutting section and the holder of the plain milling cutter are releasably and exchangeable connected with one another and when, if necessary, in addition the cutting section consists of a frontally arranged face cutting section and a cylindrical part arranged on the receiving side, which are also releasably connected with one another. This measure makes it possible to provide the same cutting sections when needed with different holders and to combine differently long cutting sections. The face cutting sections have thereby advantageously two cutting inserts per row of cutting inserts, whereas the cylindrical parts have at least two, preferably three to six cutting inserts per row of cutting inserts. It is basically also possible to design the cylindrical part as an extension or reducing piece without any cutting edges, preferably having ending chip grooves. The cutting section and the holder are thereby positively and frictionally connected by coupling members. In addition it is possible to arrange between the cutting section and the holder an adapter piece for the reciprocal adaptation to differently dimensioned coupling members on the cutting sections and holders, so that it is possible to combine also differently large cutting sections and holders with one another, which results in further storage reduction.

The coupling members can, for example, be at least two axial follower pins spaced at a specific angular distance from one another on the one side and correspondingly arranged mating bores to receive the follower pins on the other side. The frictional connection can be created by a clamping screw extending through the cutting section and engaging a taphole of the holder.

According to a further advantageous development of the invention, the coupling members are designed as a transverse rib which projects over the end of the cutting section, which end is on the receiving side, over a plane surface, can be guided into a transverse groove of the holder, which groove is defined by a flat countersurface, and can there be clamped by means of clamping screws, and as a centering pin, which can be placed into a center mating hole of the holder and projects axially centrally over the transverse rib. To create the clamping connection conical recesses are arranged offset with respect to one another in longitudinal direction of the transverse rib in two oppositely lying boundary surfaces of the transverse rib, which boundary surfaces are perpendicular with respect to the plane surface, into which can be screwed a screw with its conical tip, which screw is guided in a taphole of the holder and extends through flanks of the transverse groove, with such an axial shift that the cutting section and the holder are axially pressed against one another at their plane surfaces, which face one another. This connection principle can also be utilized between the face cutting section and the cylindrical part. Furthermore it is possible in a kinematic reversal to also arrange the transverse rib and the centering pin on the one side and the transverse groove and the mating hole on the other side interchangeably.

BRIEF DESCRIPTION OF THE DRAWINGS

The invention will be discussed hereinafter in connection with the exemplary embodiments schematically illustrated in the drawings, in which:

FIGS. 1a to 1e are a partially sectioned side view of a modularly constructed shell end mill, a partially sectioned front side view, a section along the cross-sectional line C—C of FIG. 1b and a view along the separating lines D—D and E—E of FIG. 1a;

FIG. 2 is a partially sectioned side view of the face cutting section of the shell end mill;

DETAILED DESCRIPTION IN THE CLAIMS

Figure 1B:
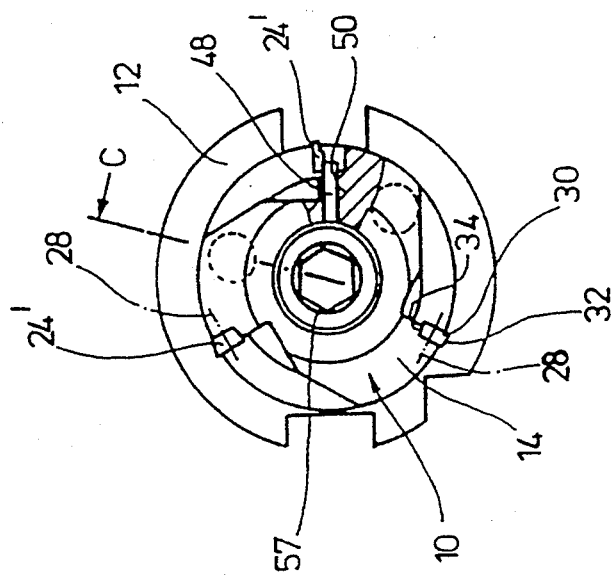
Figure 1A:
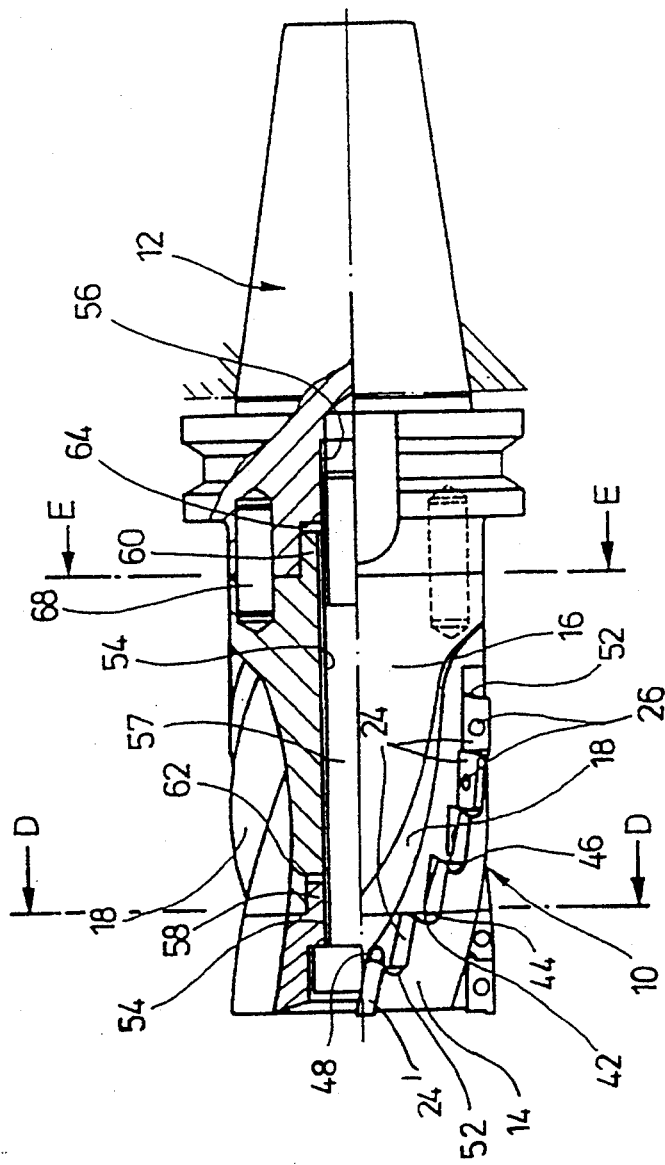
Figure 3B:
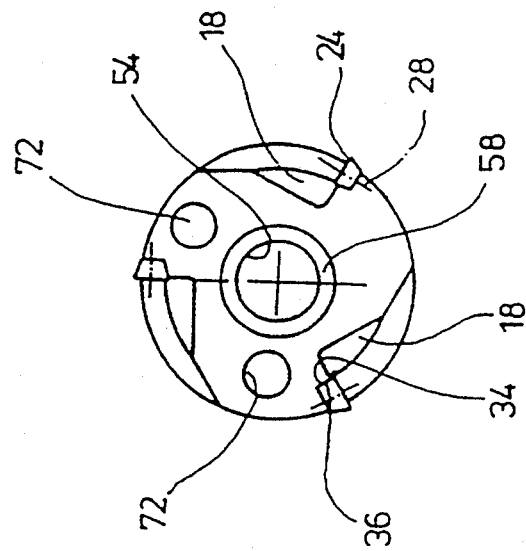
FIGS. 3a and 3b are a partially sectioned side view and top view of the cylindrical part of the shell end mill.
Figure 3A:
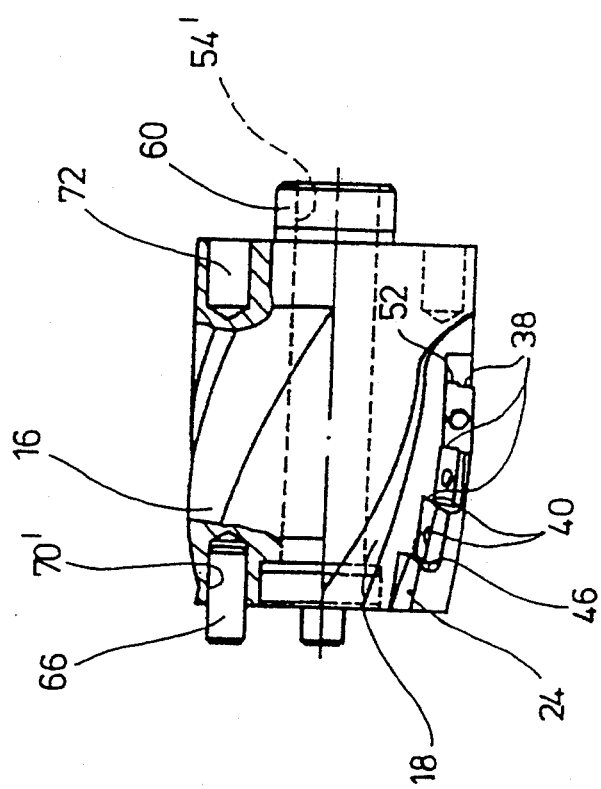

The modularly constructed shell end mill consists essentially of a cutting section and a holder 12 releasably connected to the cutting section, with the cutting section 10 being divided into a face cutting section 14 and a cylindrical part 16. The cutting section 10 contains three helical chip grooves 18 arranged at an angular distance from one another, which grooves 18 extend from the face cutting section 14 to the cylindrical part 16, and in one groove side of each groove, which groove side is the rearward side in the direction of rotation, there are arranged insert seats 20 with essentially radially aligned base support surfaces 22. The step-like arranged insert seats 20 are designated to receive essentially square indexable inserts 24, which are fastened with a center clamping screw 26 in a screw bore 28 on the cutting section 10, which screw bore 28 extends vertically through the base support surface 22. The indexable inserts 24 project with their main cutting edge 30, which extends inclined in direction of the chip groove, and their adjoining free surface 32 radially over the cylindrical circumference of the cutting section 10 and rest with their side surface 34, which is opposite the free surface 32, against a side support surface 36. The side support surface 36 consists of two surface parts, which are arranged spaced from one another and which cannot be recognized in the drawing. These surface parts guarantee a reliable two-point abutment of the side surface 34. The distance between the screw bore 28 and the side support surface 36 has, compared with the corresponding distance in the indexable insert, a small undersize of 0.1 to 0.2 mm so that a force fit is obtained when tightening the clamping screw 26. Since the side surface 34 of the indexable insert 24 is curved or beveled in longitudinal direction and the surface parts of the side support surface 36 define a corresponding obtuse angle with one another, a form lock is achieved additionally when the indexable insert is pressed against the side support surface 36, which form lock is able to absorb resulting axial cutting forces acting onto the indexable insert. FIG. 1a shows, for example, that the main cutting edge 30 of the indexable insert 24 defines with the base support surface, an acute angle diverging toward the receiving side, which angle results in a reduction of the axial cutting force component acting onto the indexable inserts.

The inner indexable inserts of each row of cutting inserts, which inner indexable inserts are arranged behind the frontal outermost cutting insert 24' project with their active side cutting edges 38 arranged on the receiving side and the free surface 40 following the same, abutment-free over the associated plate seat 20, while they are received, with their inactive cutting edge 42 arranged on the front side and the free surface following the same abutment-free, a free space formed by an undercut 46 behind the frontally adjacent cutting insert 24. The arrangement is thereby such that the axial cutting forces engaging the indexable inserts 24 are essentially balanced. Thus an axial support is not needed. An axial support is only needed on the frontal outermost cutting insert 24' of each row of cutting inserts, since the same projects axially beyond the cutting section 10 with its frontal cutting edge 42 and the following free surface 44 and is loaded through the same with axial cutting forces acting in direction of receiving. A cylinder pin 48 is provided for the axial support of the frontal outermost indexable inserts 24', which cylinder pin is inserted at a defined distance from the front surface in a bore 50 of the face cutting section. The indexable insert 24' rests with a partially cut section 52 against the cylinder pin 48, so that the similarly partially cut frontal cutting edge 42, which is spaced at a defined distance from the partially cut section 52, and can be arranged with high precision on the face cutting section.

In spite of the complicated insert shape, the insert seats can be created with a high feeding speed in the area of the base support surfaces 22 and of the following undercuts 46 in steps by shell milling into the groove sides. Also the preparatory work needed for this in the chip groove side can be expediently carried out by shell milling. With the plurality of insert seats to be created this manufacturing advantage is of special importance.

The connection between the face cutting section 14, cylindrical part 16 and holder 12 is done with the aid of a clamping screw 57 extending through a center bore 54, 54' in the face cutting section 14 and cylindrical part 16 and threadable into a taphole 56 of the holder 12. The reciprocal centering is thereby done by fitted pins 58, 60, which are received in mating bores 62, 64 of the adjacent part. The rotation is accomplished through concentrically aligned, eccentrically aligned cylindrical follower pins 66, 68, which extend into mating bores 70, 70' or rather 72, 72' of the parts to be connected.

Figure 4:
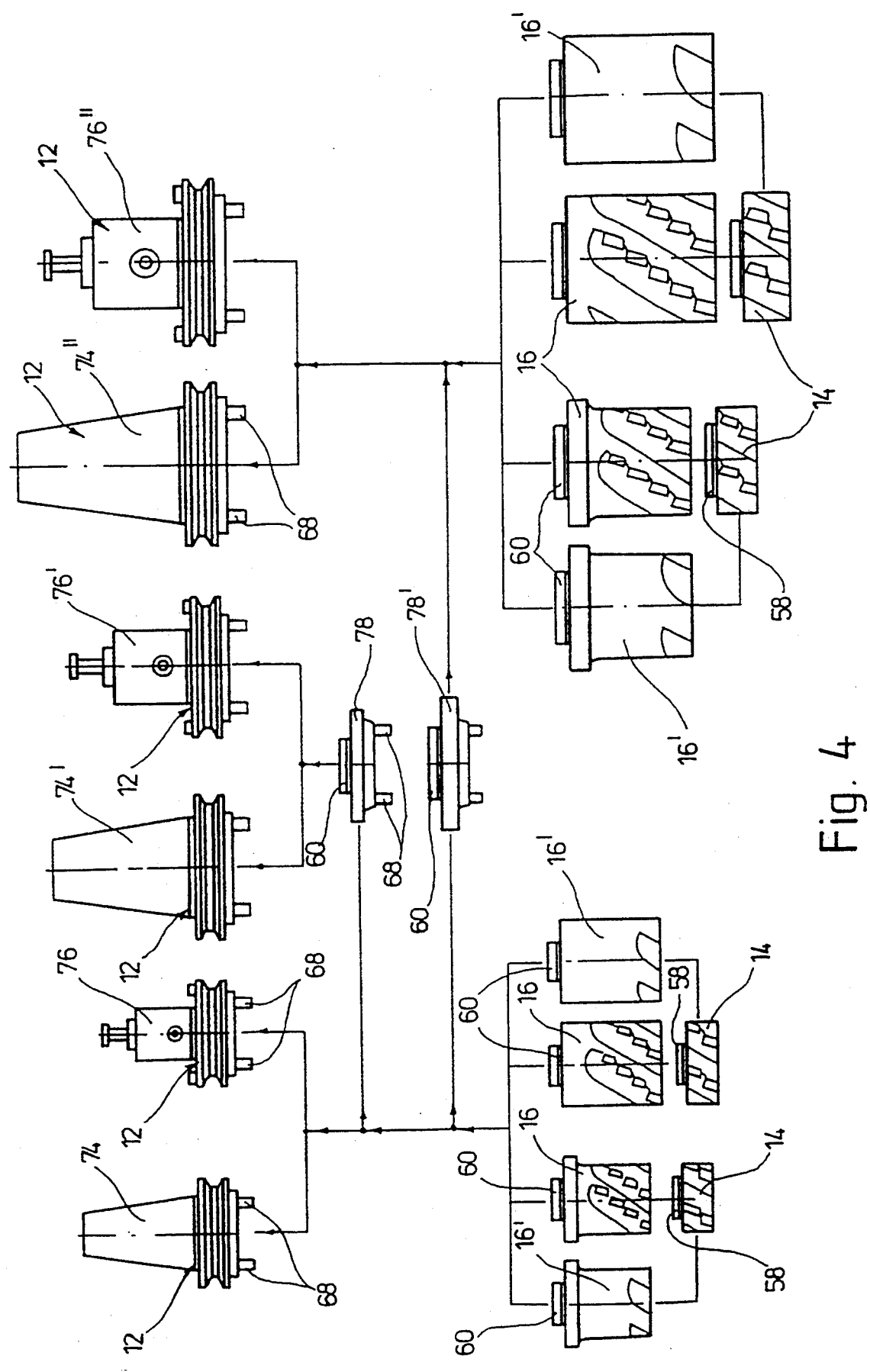
FIG. 4 shows a diagram for the modular design of different shell end mills of different basic building components.

The holder 12 is in the exemplary embodiment illustrated in FIG. 1a designed as a steep-angle taper. FIG. 4 shows that in place thereof, steep-angle taper holders 74, 74', 74", which have different sizes can also be used. Also, other basic holders, like a fitted pin / plane surface coupling 76, 76', 76", a not illustrated Morse taper coupling or a not illustrated flange coupling can be used. What is important here is only that the mating coupling members, like the cylinder pins 68 or the mating bores 64 are provided on the side of the cutting section 10. The connecting of small cutting sections 10 to larger holders 12 is basically possible by interpositioning suitable adapters 78, 78', which effect an adaptation of the different connection measurements of the mentioned coupling members and can be designed as relatively simple, disk-shaped intermediate pieces.

If needed, it is also possible to utilize instead of the cylindrical parts 16 with indexable inserts 24, insert-free cylindrical parts 16' with the function of an extension or reduction, which have only chip grooves which terminate on their surface. Thus the illustration in FIG. 4 shows that the modular design of the shell end mill enables a plurality of combinations of different holders 12, cylindrical parts 16, 16' and face cutting sections 14, which by interpositioning adapters 78, 78' can be combined with one another also in the case of different sizes. The thus achievable advantages during storage are obvious.

In summary the following is to be said: The invention relates to a shell end mill with a holder 12, a two-part cylindrical cutting section 10 releasably connected to the holder 12, at least two helical chip grooves 18 arranged in the cutting section 10 and spaced from one another in circumferential direction, and each one row of insert seats 20 arranged one behind the other along one chip groove side and each one having an essentially radially aligned base support surface 22 and a side support surface radially defining the same on the side of the base of the groove for receiving indexable inserts 24 in an arrangement of axially overlapping pairs. The inner cutting inserts 24 arranged behind the frontal outermost indexable insert 24' are clamped axially abutment-free on the insert seats. In particular, the inner cutting inserts 24 engage abutment-free with their frontal ineffective cutting edge 42, an undercut 46 of the adjacent insert seat. This design makes it possible to create the base support surfaces 22 of the insert seat and the undercuts 46 following these on the receiving side in a particularly simple and expedient manner by shell milling in the cutting section 10.

The embodiments of the invention in which an exclusive property or privilege is claimed are defined as follows:

1. In a shell end mill having a holder, a cylindrical cutting section including a rearward end connected to the holder and a forward end, and at least two helical chip grooves arranged in the cutting section and spaced from one another in a circumferential direction, each chip groove including a row of insert seats arranged one after the other along one chip groove side, each said insert seat having a generally radially aligned base support surface and a side support surface wherein each said base support surface is defined on three sides by an outward side, a support side radially inwards of said outward side and a rearwardly disposed receiving side and wherein each said side support surface radially defines said insert seat on the support side of the base support surface of the chip groove and is adapted for receiving generally square cutting inserts, each row of said insert seats including a plurality of cutting inserts and means for securing said cutting inserts in said insert seats comprising center clamping screws each adapted to engage one of said cutting inserts and screw bores each formed in the area of one of the base support surfaces, each of said cutting inserts being formed as an indexable insert with a forward end, a rearward end, a first surface seated on said base support surface, and a second surface opposite said first surface, being fastened on the cutting section by means of said center clamping screw engaging said screw bore in the area of the base support surface (22), and being positioned in an arrangement of axially overlapping pairs where adjacent ends of adjacent cutting inserts are facing one another, each said cutting insert having a main cutting edge proximate a circumference of the cutting section and defined by said second surface and a free surface following said main cutting edge along said circumferential direction away from said second surface wherein said main cutting edge and said free surface project radially beyond the circumference of the cutting section, each row of said cutting inserts including a frontal outermost cutting insert having a face cutting edge proximate said forward end of said cutting section and defined by said second surface and a free surface following said face cutting edge along said circumferential direction wherein said face cutting edge and said free surface project axially beyond the cutting section each row including inner cutting inserts arranged behind the frontal outermost cutting insert, each inner cutting insert having an active cutting edge arranged proximate said rearward receiving side of the insert seat and defined by said second surface and a free surface following said active cutting edge along said circumferential direction so as to be abutment-free over the associated insert seat, the improvement comprising: each said insert seat having a free space formed opposite said receiving side thereof by an undercut of said receiving side of an adjacent insert seat, each said inner cutting insert having a frontally arranged inactive cutting edge opposite the active cutting edge thereof and defined by said second surface and a free surface following said inactive cutting edge along said circumferential direction so as to be abutment-free axially, each inactive cutting edge positioned adjacent said free space of said insert seat adjacent thereto which is formed by said undercut of the receiving side of the adjacent insert seat behind the frontally adjacent cutting insert.

2. The shell end according to claim 1, wherein the frontal outermost cutting insert of each row of cutting inserts is supported proximate an area of a rearward cutting edge on the receiving side of the insert seat, said outermost cutting insert having a rearward free surface following said rearward cutting edge along said circumferential direction and abutting a cutting-section-fixed axial abutment.

3. The shell end according to claim 2, wherein the abutment is constructed as a cylinder pin embedded in the cutting section and having an end projecting over the base support surfaces.

4. The shell end according to claim 1, wherein the base support surfaces of the insert seats and the undercuts of the cutting section which follow the base support surfaces on the receiving sides thereof, are shell milled.

5. The shell end mill according to claim 1, wherein the base support surface of each insert seat and the main cutting edge of the cutting insert mutually adjacent thereto define an acute angle with one another, which angle converges in a direction toward the holder.

6. The shell end mill according to claim 1, wherein the side support surface is divided into two surface parts arranged spaced from one another and defining a two-point abutment for supporting the associated cutting insert.

7. The shell end mill according to claim 6, wherein a side surface of the cutting insert resting against the side support surface of the insert seat is slightly curved or beveled and is positively and frictionally pressed against the surface parts of the side support surface, said surface parts being aligned differently in adaptation to the curvature or beveling.

8. The shell end mill according to claim 1, wherein a center distance between the screw bore and the side support surface of each insert seat has in comparison with the respective dimension on the cutting insert an undersize of 0.1 to 0.2 mm.

9. The shell end mill according to claim 1, wherein the cutting section and the holder are releasably and exchangeably connected to one another.

10. The shell end mill according to claim 9, wherein two parts which comprise the cutting section and the holder are positively and frictionally connected with one another by coupling members.

11. The shell end mill according to claim 10, wherein between the cutting section and the holder there is arranged an adapter for the reciprocal adaptation of differently dimensioned coupling members between the cutting sections and holders.

12. The shell end mill according to claim 11, wherein the coupling members have a clamping screw extending through the cutting section and engaging a taphole of the holder.

13. The shell end mill according to claim 11, wherein the coupling members have a centering pin axially projecting from one part and a mating bore receiving the centering pin and arranged on the other part.

14. The shell end mill according to claim 11, wherein the one part has at one end thereof a transverse rib projecting beyond a plane surface which is guidable into a transverse groove of an opposing plane surface of the other part, said transverse groove being defined by a flat countersurface and being clampable with the transverse groove by means of clamping screws, the one part including a centering pin insertable into a center mating hole of the other part and axially centrally projecting over the transverse rib.

15. The shell end mill according to claim 14, wherein conical recesses are arranged offset with respect to one another in longitudinal direction of the transverse rib in two oppositely lying sides of the transverse rib, said sides being perpendicular with respect to the plane surface and the conical recesses each receiving one screw with a conical tip, said screw being guided in a taphole of the other part and extends through the sides of the transverse groove to be received by the transverse rib and are formed so as to be screwed with such an axial shift that the one and the other part are axially pressed against one another with their plane surfaces.

16. The shell end mill according to claim 10, wherein the coupling members have at least two concentric follower pins positioned a defined angular distance from one another on one of the cutting section and holder, and mating bores on the other of the cutting section and holder.

17. The shell end mill according to claim 1, wherein the cutting section consists of a frontally arranged face cutting section and a cylindrical part arranged on a receiving side thereof, which are releasably connected with one another.

18. The shell end mill according to claim 17, wherein the face cutting section has two cutting inserts per row of cutting inserts.

19. The shell end mill according to claim 17, wherein the cylindrical part has at least two cutting inserts per row of cutting inserts.

20. The shell end mill according to claim 17, wherein the cylindrical part is formed as an extension or reduction piece which has no cutting edges and has said chip grooves terminating thereat.

21. In a shell end mill having a cylindrical cutting section including a rearward end, a forward end and at least two helical chip grooves arranged therebetween and spaced apart in a circumferential direction, each chip groove including a row of insert seats arranged one after the other along one chip groove side, each said insert seat having a generally radially aligned base support surface extending radially inwards and having a rearwardly disposed receiving side, each row of said insert seats including a plurality of indexable cutting inserts and means for securing said cutting inserts in said insert seats, each of said cutting inserts having a forward end, a rearward end, a first surface seated on said base support surface of the insert seat adjacent thereto, and a second surface opposite said first surface, and being fastened on the cutting section by said securing means in an arrangement of axially overlapping pairs of adjacent cutting inserts, each said cutting insert having a main cutting edge disposed proximate a circumference of the cutting section, each row of said cutting inserts including a frontal outermost cutting insert having a face cutting edge at the forward end thereof disposed proximate said forward end of said cutting section and including inner cutting inserts arranged rearwardly of the frontal outermost cutting insert, each inner cutting insert having an active cutting edge disposed proximate said rearward receiving side of the insert seat adjacent thereto and adapted to be abutment-free over the insert seat, the improvement comprising: each said insert seat having a free space formed opposite said receiving side thereof by an undercut of said receiving side of an adjacent insert seat, each said inner cutting insert having a frontally arranged inactive cutting edge opposite the active cutting edge thereof and adapted to be abutment-free axially, and each inactive cutting edge positioned adjacent said free space of said insert seat which is formed by said undercut of the receiving side of the adjacent insert seat behind the frontally adjacent cutting insert.

* * * * *

UNITED STATES PATENT AND TRADEMARK OFFICE
CERTIFICATE OF CORRECTION

PATENT NO. : 5 425 603
DATED : June 20, 1995
INVENTOR(S) : Bernd DUTSCHKE, et al It is certified that error appears in the above-indentified patent and that said Letters Patent is hereby corrected as shown below:

On the tile page, item [75] change first inventor's residence from "Vaihingen an der Enz-Kleinglattbach" to
---Vaihingen/Enz-Kleinglattbach---.
Column 6, line 26; delete "(22)".
Column 6, line 42; after "section" insert ---,---.
Column 8, line 12; after "bores" insert
---for receiving the follower pins---.

Signed and Sealed this

Thirtieth Day of January, 1996

Attest:

BRUCE LEHMAN

Attesting Officer

Commissioner of Patents and Trademarks